(12) United States Patent
Cheong et al.

(10) Patent No.: US 7,757,247 B2
(45) Date of Patent: Jul. 13, 2010

(54) SMALL FORM FACTOR OPTICAL/MAGNETIC DISK FOR INFORMATION STORAGE

(75) Inventors: Woo Seok Cheong, Daejeon (KR); Yong Goo Yoo, Daejeon (KR); Sung Q Lee, Daejeon (KR); Ho Jun Ryu, Seoul (KR); Mun Cheol Paek, Daejeon (KR); Eun Kyoung Kim, Daejeon (KR); Kang Ho Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 392 days.

(21) Appl. No.: 11/288,693

(22) Filed: Nov. 29, 2005

(65) Prior Publication Data

US 2006/0123441 A1 Jun. 8, 2006

(30) Foreign Application Priority Data

Dec. 8, 2004 (KR) ............ 10-2004-0103070
Aug. 12, 2005 (KR) ............ 10-2005-0074439

(51) Int. Cl.
*G11B 7/24* (2006.01)
*G11B 23/03* (2006.01)
*G11B 3/70* (2006.01)
*G11B 5/84* (2006.01)
*G11B 7/26* (2006.01)
*G11B 5/82* (2006.01)

(52) U.S. Cl. .............. 720/722; 369/282; 360/135
(58) Field of Classification Search ........... 720/721, 720/722, 723, 724; 428/848.8, 900; 156/514, 156/563; 369/282; 360/135
See application file for complete search history.

(56) References Cited

U.S. PATENT DOCUMENTS

| 2,694,578 | A | * | 11/1954 | Smith, II ............ 369/273 |
| 4,549,922 | A | * | 10/1985 | Oishi et al. ......... 156/293 |
| 4,562,505 | A | * | 12/1985 | Mroz .............. 360/135 |
| 4,797,764 | A | * | 1/1989 | Doering ............ 360/135 |
| 4,829,510 | A | * | 5/1989 | Takahashi ......... 720/721 |

(Continued)

FOREIGN PATENT DOCUMENTS

JP         6004907         1/1994

(Continued)

*Primary Examiner*—Andrea L Wellington
*Assistant Examiner*—Adam B Dravininkas
(74) *Attorney, Agent, or Firm*—Ladas & Parry LLP (57) ABSTRACT

Provided is a small form factor optical/magnetic disk including an integrated metal hub and a disk plate. The integrated metal hub includes a circular upper metal hub and a circular lower metal hub integrally formed with and disposed under the upper metal hub. The circular lower metal hub has a smaller diameter smaller than the upper metal hub. A central hole is formed in central portions of the upper and lower metal hubs and passes through the upper and lower metal hubs. The disk plate has a through-hole that is formed in a central portion and is directly associated with the integrated metal hub, and a recess that is formed around the through-hole and allows the upper metal hub to be mounted therein. Since the central portion of the small form factor optical/magnetic disk is not thick, the small form factor optical/magnetic disk can contribute to an ultra thin small form factor information storage device. Also, since manufacturing processes are simple, price and quality competitiveness can be enhanced.

20 Claims, 6 Drawing Sheets

U.S. PATENT DOCUMENTS

| | | | |
|---|---|---|---|
| 4,903,224 A * | 2/1990 | Namiki et al. | 720/724 |
| 4,944,982 A * | 7/1990 | Kikuchi | 428/64.4 |
| 4,999,727 A * | 3/1991 | Kato | 360/133 |
| 5,057,960 A * | 10/1991 | Shiba et al. | 360/133 |
| 5,265,086 A * | 11/1993 | Ota et al. | 369/284 |
| 5,323,381 A * | 6/1994 | Takahashi et al. | 369/282 |
| 5,353,278 A * | 10/1994 | Murakami et al. | 720/721 |
| 5,458,940 A * | 10/1995 | Woo | 428/848.9 |
| 5,504,735 A * | 4/1996 | Ota et al. | 369/282 |
| 5,572,509 A * | 11/1996 | Kobayashi et al. | 720/721 |
| 5,657,311 A * | 8/1997 | Takahashi | 720/723 |
| 5,859,834 A * | 1/1999 | Takahashi et al. | 720/723 |
| 5,864,534 A * | 1/1999 | Fairchild et al. | 720/721 |
| 5,974,024 A | 10/1999 | Konishi et al. | |
| 6,285,651 B1 * | 9/2001 | Boutaghou et al. | 720/721 |
| 6,817,026 B2 * | 11/2004 | Berg et al. | 720/721 |
| 7,027,385 B1 * | 4/2006 | Shimazaki et al. | 369/281 |
| 2002/0054566 A1 * | 5/2002 | Netsu et al. | 369/291 |
| 2003/0157292 A1 | 8/2003 | Medower et al. | |

FOREIGN PATENT DOCUMENTS

| | | |
|---|---|---|
| JP | 9106581 | 4/1997 |
| KR | 1996 0008804 | 3/1996 |

* cited by examiner

SMALL FORM FACTOR OPTICAL/MAGNETIC DISK FOR INFORMATION STORAGE

CROSS-REFERENCE TO RELATED PATENT APPLICATION

This application claims the benefit of Korean Patent Application Nos. 10-2004-0103070, filed on Dec. 8, 2004 and 10-2005-0074439, filed on Aug. 12, 2005, in the Korean Intellectual Property Office, the disclosures of which are incorporated herein in their entirety by reference.

BACKGROUND OF THE INVENTION

1. Field of the Invention

The present invention relates to a small form factor optical/magnetic disk for information storage, and more particularly, to a small form factor optical/magnetic disk having a metal hub.

2. Description of the Related Art

In general, information storage devices, for example, disk driving devices, are required to have small form factors in order to meet the requirements of small electronic systems. Also, optical or magnetic disks used for information storage devices are now designed to be detachable in order to increase user convenience and achieve easy transfer of information.

A small form factor optical/magnetic disk having a diameter of approximately 1 inch has a metal hub attached to a central portion of a disk plate. The optical/magnetic disk is rotated about a spindle motor shaft, which is coupled to the center of the metal hub, for reading or writing of information. It is known that a process of attaching the metal hub to the central portion of the disk plate is the most difficult process in manufacturing the small form factor optical/magnetic disk.

Figure 1:
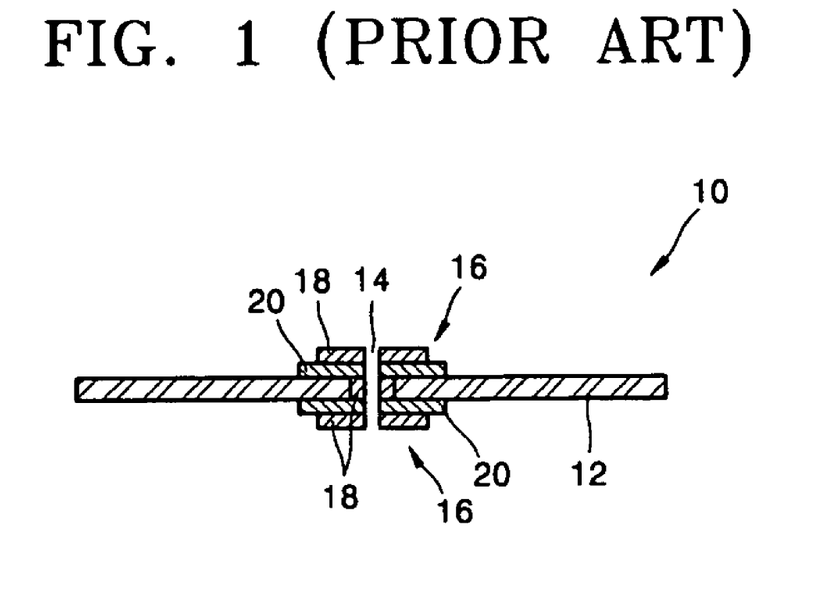
FIG. 1 is a cross-sectional view of, a conventional small form factor optical disk.

FIG. 1 is a cross-sectional view of a conventional small form factor optical disk 10 disclosed in U.S. Patent Publication No. 2003/0157292 issued to DataPlay, Inc.

Referring to FIG. 1, the small form factor optical disk 10 includes a metal hub 16 installed around a central hole 14 of a disk plate 12 to couple the small form factor optical disk 10 to a spindle motor shaft (not shown) of an information storage device to rotate at high speed.

The metal hub 16 protrudes over and under the disk plate 12. The metal hub 16 includes a metal plate 18 and an intermediate plate 20. The disk plate 12 and the intermediate plate 20 are made of polycarbonate. The metal hub 16 is attached to the disk plate 12 by first coupling the metal plate 18 and the intermediate plate 20, precisely aligning the coupled metal plate 18 and intermediate plate 20 around the central hole 14 of the disk plate 12, and attaching the coupled metal plate 18 and intermediate plate 20 to the disk plate 12. The intermediate plate 20 of the metal hub 16 is attached to the disk plate 12 using an epoxy.

Since the metal hub 16 is formed by stacking the metal plate 18 and the intermediate plate 20 around the central hole 14 of the disk plate 12, the thickness of the central portion of the optical disk 10 increases greatly. As the thickness of the central portion of the optical disk 10 increases, the height of the spindle motor shaft for rotating the disk 10 increases and the overall thickness of the small form factor information storage device 10 increases as well.

Also, the small form factor optical disk 10 of FIG. 1 has a drawback of high manufacturing costs since the process of attaching the metal hub 16 to the disk plate plate 12 is complicated as described above. The small form factor disk 10 of FIG. 1 has a further problem in that it is difficult to precisely align and attach the coupled metal plate 18 and the intermediate plate 20 around the central hole 14 of the disk plate 12.

Figure 2:
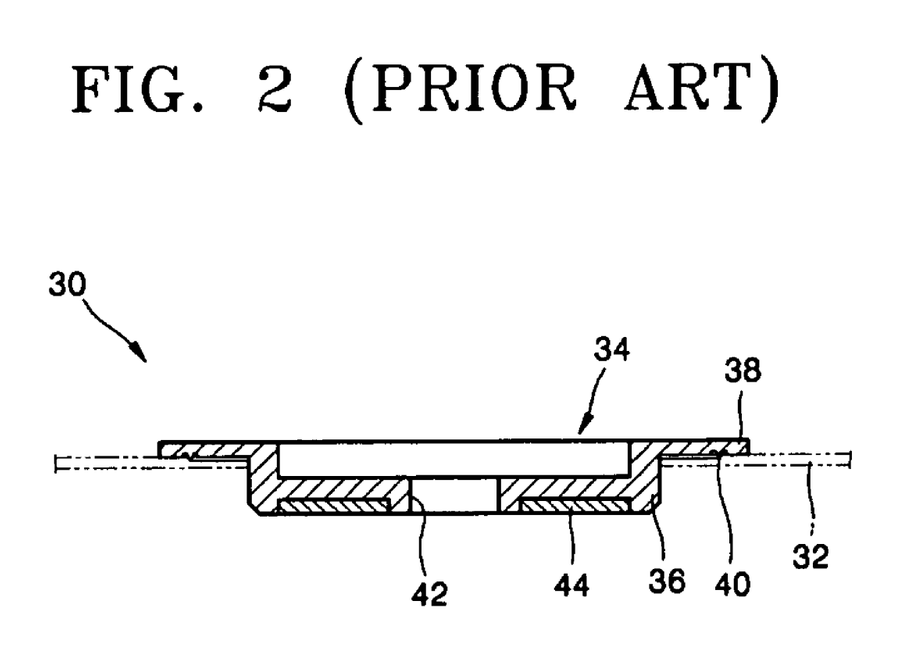
FIG. 2 is a cross-sectional view of another conventional disk.

FIG. 2 is a cross-sectional view of a conventional disk 30 disclosed in U.S. Pat. No. 5,947,024 issued to Sharp. The disk 30 includes a disk plate 32 and a disk hub 34. The disk hub 34 includes a main body 36, a flange 38 formed along an edge of the main body 36, an energy director 40 installed under the flange 38, and a central hole 42 formed in a central portion of the main body 36. A magnetic plate 44 is installed in the main body 36. The disk hub 34 is attached to the disk plate 32. When the disk hub 34 and the disk plate 32 are coupled to each other, the disk plate 32 and the energy director 40, which is made of a hard synthetic resin, are attached to each other using an ultrasonic process.

Since the disk 30 of FIG. 2 is housed in a cartridge case and the central portion of the disk hub 34 is also thick, it is difficult to realize the disk 30 of FIG. 2 as a small form factor disk.

SUMMARY OF THE INVENTION

The present invention provides a small form factor optical/magnetic disk having a thin central portion used for an information storage device.

According to an aspect of the present invention, there is provided a small form factor optical/magnetic disk comprising an integrated metal hub and a disk plate. The integrated metal hub comprises a circular upper metal hub, and a circular lower metal hub integrally formed with and disposed under the upper metal hub. The circular lower metal hub has a smaller diameter than the upper metal hub. A central hole is formed in and passes through central portions of the upper and lower metal hubs.

The disk plate has a through-hole that is formed in a central portion and is directly associated with the integrated metal hub, and a recess that is formed around the through-hole and allows the upper metal hub to be mounted therein.

According to another aspect of the present invention, there is provided a small form factor optical/magnetic disk comprising an integrated metal hub and a disk plate. The integrated metal hub comprises a circular upper metal hub having a central portion and a circumferential portion formed around the central portion, and a circular lower metal hub integrally formed with and disposed under the upper metal hub to correspond to the central portion of the upper metal hub. A central hole is formed in and passes through central portions of the upper and lower metal hubs.

The disk plate has a through-hole that has a diameter equal to the diameter of the lower metal hub and a depth equal to the thickness of the integrated metal hub, and a recess that is formed around the through-hole and has a depth equal to the thickness of the upper metal hub and a width corresponding to a difference between the diameters of central portion and the circumferential portion. The integrated metal hub may be inserted into the through-hole and mounted in the recess of the disk plate.

According to still another aspect of the present invention, there is provided a small form factor optical/magnetic disk comprising an integrated metal hub, an intermediate body, and a disk plate. The integrated metal hub comprises a circular upper metal hub, and a circular lower metal hub that is integrally formed with and disposed under the upper metal hub. The circular lower metal hub has a smaller diameter than the upper metal hub. A central hole is formed in and passes through central portions of the upper and lower metal hubs.

The intermediate body is formed around the lower metal hub and has a smaller diameter than the upper metal hub and a thickness equal to the thickness of the lower metal hub. The disk plate has a through-hole that is formed in a central portion and is directly associated with the integrated metal hub and the intermediate body, and a recess that is formed around the through-hole and allows the upper metal hub to be mounted therein.

Since the central portion of the small form factor optical/magnetic disk is not thick, the small form factor optical/magnetic disk can contribute to an ultra thin small form factor information storage device. Also, since manufacturing processes are simple, price and quality competitiveness can be enhanced.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. This invention may, however, be embodied in many different forms and should not be construed as being limited to the embodiments set forth herein. Rather, these embodiments are provided so that this disclosure will be thorough and complete and will fully convey the scope of the invention to those skilled in the art. In the drawings, the forms of elements are exaggerated for clarity, and like reference numerals denote like elements.

Figure 3:
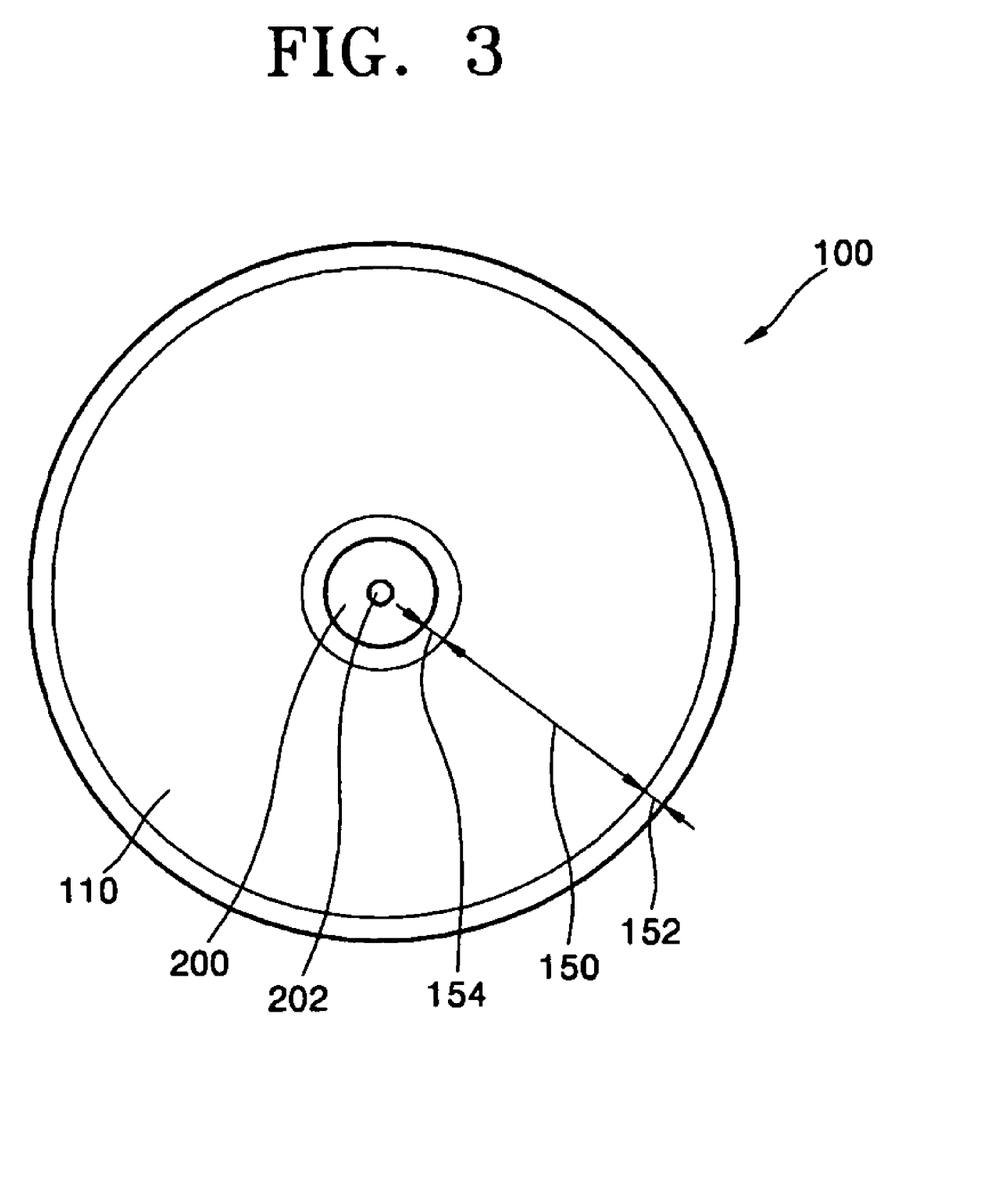
FIG. 3 is a plan view of a small form factor optical/magnetic disk for information storage according to an embodiment of the present invention.

FIG. 3 is a plan view of a small form factor optical/magnetic disk 100 for information storage according to an embodiment of the present invention.

Referring to FIG. 3, the small form factor optical/magnetic disk 100 for information storage has a diameter of 20-80 mm and a thickness of 0.3-3.0 mm. The small form factor optical/magnetic disk 100 includes a disk plate 110 made of polycarbonate, and an integrated metal hub 200 installed at a central portion of the disk plate 100. A central hole 202 is formed in the integrated metal hub 200 to allow a spindle motor shaft (not shown) of an information storage device to pass through. The disk plate 110 includes a data zone 150 on which information is recorded and non-data zones 152 and 154 on which no information is recorded.

In particular, the integrated metal hub 200, which is explained later, does not have an intermediate plate. Since the integrated metal hub 200 can be directly coupled to the disk plate 110, the optical/magnetic disk 100 can be manufactured simply. The spindle motor shaft of the information storage device is coupled to the small form factor optical/magnetic disk 100 through the central hole 202 of the integrated metal hub 200. Accordingly, information can be read from or written to the small from factor optical/magnetic disk 100 by rotating the small form factor optical/magnetic disk 100 at high speed using the integrated metal hub 200 coupled to the spindle motor shaft with a magnet.

The structure of the small form factor optical/magnetic disk 100 of FIG. 3 and the manufacturing method thereof will be explained below. The thicknesses and ratios of the elements of the small form factor optical/magnetic disk have been optimized by the inventors of the present invention. Accordingly, the effect of the invention can be maximized using the optimized elements.

FIRST EMBODIMENT

Figure 4:
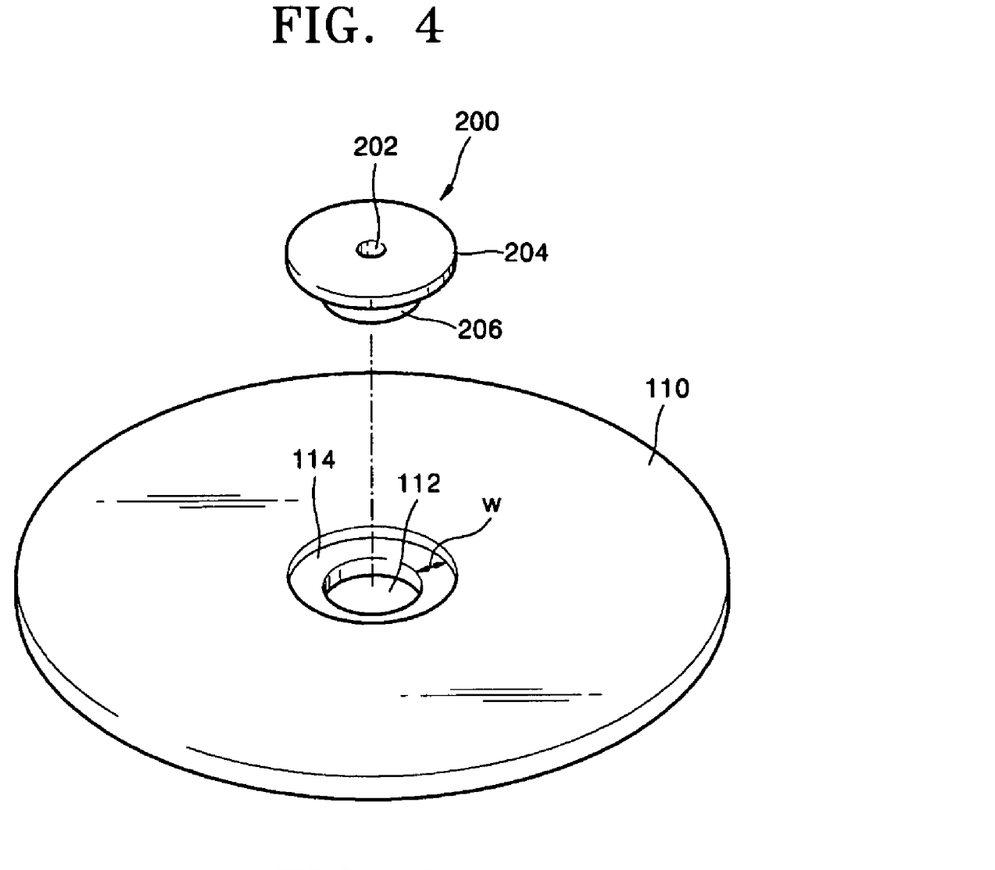
FIG. 4 is an exploded perspective view of a small form factor optical/magnetic disk according to an embodiment of the present invention.
Figure 5:
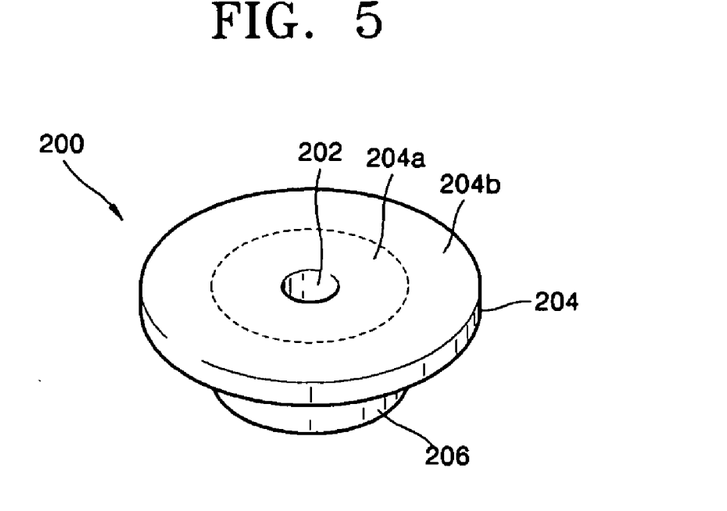
FIG. 5 is an enlarged view of an integrated metal hub of the small form factor optical/magnetic disk of FIG. 4.

FIG. 4 is an exploded perspective view of a small form factor optical/magnetic disk according to an embodiment of the present invention. FIG. 5 is an enlarged view of a metal hub of the small form factor optical/magnetic disk of FIG. 4.

The small form factor optical/magnetic disk includes an integrated metal hub 200 having a central hole 202 formed therein, and a disk plate 110 having a recess 114 formed around a through-hole 112. Unlike the conventional art, the small form factor optical/magnetic disk of the present embodiment includes the integrated metal hub 200 without an intermediate plate such that the integrated metal hub 200 is directly coupled to the disk plate 110. Accordingly, the small form factor optical/magnetic disk of FIG. 4 can be manufactured in a simple process.

The thickness of the integrated metal hub 200 is equal to the thickness of the disk plate 110. The thickness of the integrated metal hub 200 is in the range of 0.3-3.0 mm. The integrated metal hub 200 includes a circular upper metal hub 204 and a lower metal hub 206. The upper metal hub 204 and the lower metal hub 206 are made of metal. The integrated metal hub 200 consisting of the upper metal hub 204 and the lower metal hub 206 has a diameter of 5-30 mm in the range of 20-40% of the diameter of the disk 100. For example, the diameter of the lower metal hub 206 may be 5 mm, and the diameter of the upper metal hub 204 may be 30 mm.

The upper metal hub 204 includes a central portion 204a in which the central hole 202 is formed, and a circumferential portion 204b formed around the central portion 204. The thickness of the upper metal hub 204 is less than the thickness of the lower metal hub 206. The thickness of the upper metal hub 204 is in the range of 20-50% of the thickness of the metal hub 200. The lower metal hub 206 is formed under the upper metal hub 204 to correspond to the central portion 204a. The diameter of the lower metal hub 206 is equal to the diameter of the central portion 204a of the upper metal hub 204. The diameter of the lower metal hub 206 is in the range of 50-90% of the diameter of the upper metal hub 204.

The central hole 202 is formed in the center of the metal hub 200 to pass through the upper metal hub 204 and the lower metal hub 206. The central hole 202 allows a spindle motor shaft of an information storage device to pass there-through and thus act as a central axis when the optical/magnetic disk rotates at high speed. The diameter of the central hole 202 is in the range of 0.5-2.5 mm.

The through-hole 112 is formed in a central portion of the disk plate 110 connected to the metal hub 200. The diameter of the lower metal hub 206 is equal to the diameter of the through-hole 112. The recess 114 is formed around the through-hole 112. A difference between the diameters of the upper metal hub 204 and the lower metal hub 206 is equal to the width w of the recess 114 formed around the through-hole 112. The thickness of the upper metal hub 204 is equal to the depth of the recess 114. Accordingly, the metal hub 200 can be precisely inserted into the through-hole 112 and mounted in the recess 114.

Figure 6:
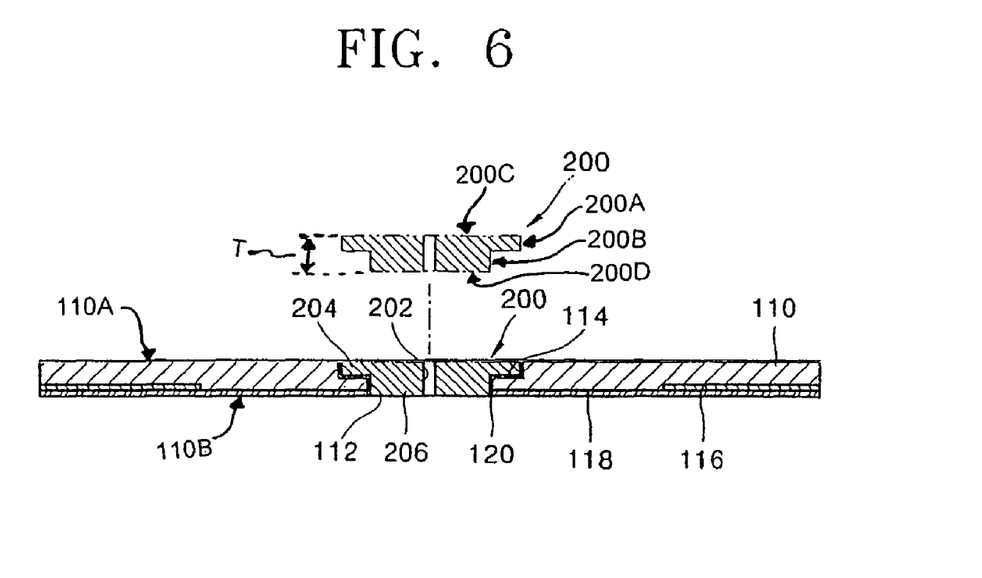
FIG. 6 is a cross-sectional view of the small form factor optical/magnetic disk of FIG. 4.
Figure 7:
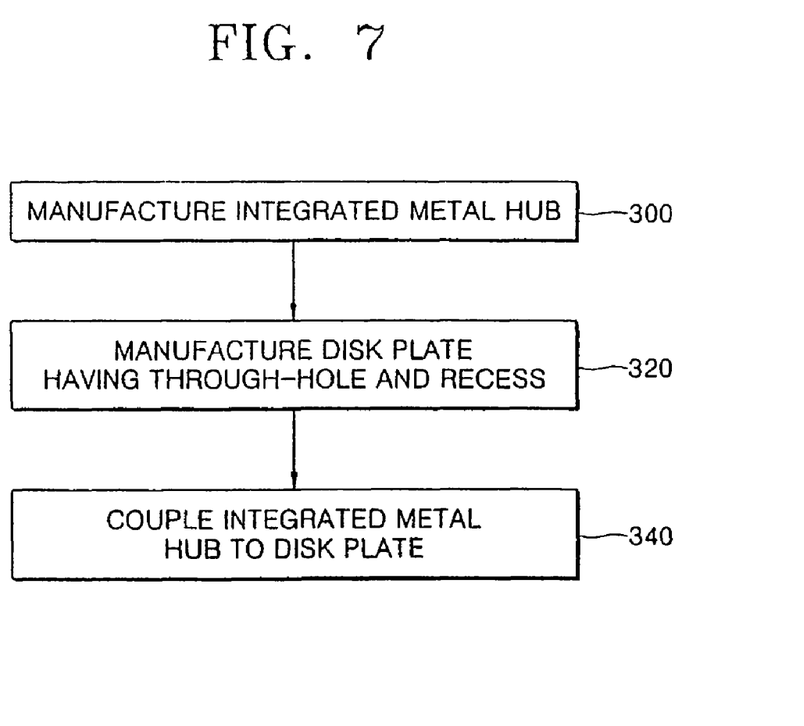
FIG. 7 is a flow chart illustrating a method of manufacturing the small form factor optical/magnetic disk of FIG. 4.

FIG. 6 is a cross-sectional view of the small form factor optical/magnetic disk of FIG. 4 when the integrated metal hub 200 is coupled to the disk plate 110. The integrated metal hub 200 is shown nested within the through-hole 112 of the disk plate 110 in which the top surface 200A and the bottom surfaces 200B of the integrated metal hub 200 are shown to be substantially flush with the disk plate 110. The overall thickness T of the integrated metal hub 200 is shown to be equal to that of the disk plate 100 such that the upper surface 200C and the lower surface 200D of the integrated metal hub 200 are coplanar with the corresponding upper surface 110A and the lower surface 110B of the disk plate 110. FIG. 7 is a flow chart illustrating a method of manufacturing the small form factor optical/magnetic disk of FIG. 4.

Referring to FIG. 7, In operation 300, the integrated metal hub 200 is manufactured. The integrated metal hub 200 is made of metal, e.g., nickel or iron, attracted to a magnet. A surface of the integrated metal hub 200 is subjected to oxidation resistant coating. The structure of the integrated metal hub 200 has been described in detail with reference to FIGS. 4 and 5, and will not be repeated.

In operation 320, the disk plate 110 having the through-hole 112 and the recess 114 is manufactured. The disk plate 110 is made of polycarbonate. The recess 114 is formed during a disk molding process for forming the disk plate 110. The through-hole 112 is formed using a punching process after the disk plate 110 is manufactured.

A data recording layer 116 for information recording and a protective layer 118 are formed on an upper or lower side of the disk plate 110. FIG. 6 shows the case where the data recording layer 116 is located on the lower side of the disk plate 110 for convenience of description. The position of the data recording layer 116 can be varied according to the size and the storage capacity of the information storage device. The data recording layer 116 may be formed at a distance of 0.5-3.0 mm from an outer circumference of the disk plate 110.

In operation 340, the integrated metal hub 200 is coupled to the disk plate 100 using an epoxy 120. The diameter of the through-hole 112 is equal to the diameter of the lower metal hub 206, and the depth of the through-hole 112 is equal to the overall thickness of the metal hub 200. The recess 114 has a depth equal to the thickness of the upper metal hub 204 and a width corresponding to a difference between the diameters of the central portion 202 and the circumferential portion 208. Accordingly, the integrated metal hub 200 is inserted into the through-hole 112 and mounted on the recess 114 of the disk plate 110.

SECOND EMBODIMENT

Figure 8:
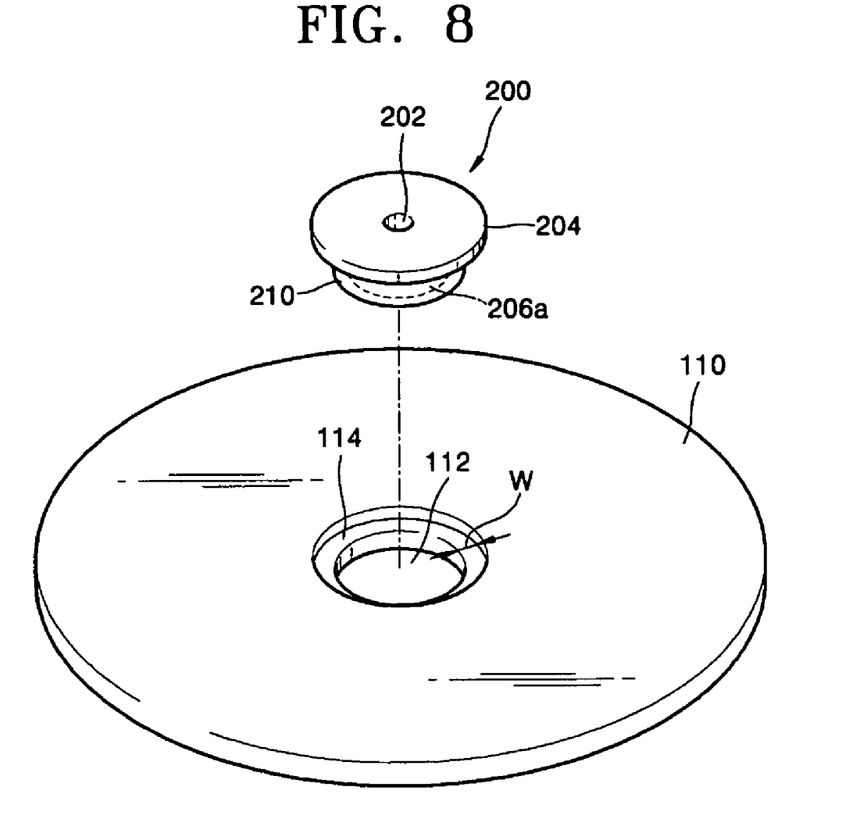
FIG. 8 is an exploded perspective view of a small form factor optical/magnetic disk according to another embodiment of the present invention.
Figure 9:
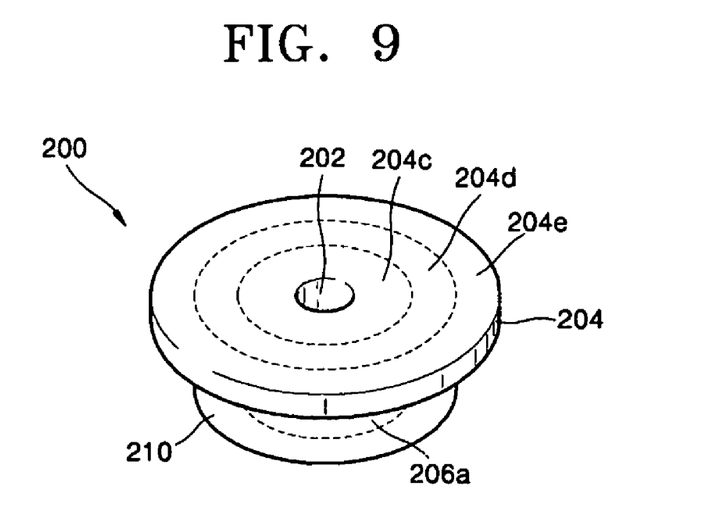
FIG. 9 is an enlarged view of an integrated metal hub of the small form factor optical/magnetic disk of FIG. 8.

FIG. 8 is an exploded perspective view of a small form factor optical/magnetic disk according to another embodiment of the present invention. FIG. 9 is an enlarged view of an integrated metal hub of the small form factor optical/magnetic disk of FIG. 8.

The small form factor optical/magnetic disk of FIG. 8 is the same as the small form factor optical/magnetic disk of FIG. 4 except that the diameter of a lower metal hub 206a is smaller than the diameter of the lower metal hub 206 of the small form factor optical/magnetic disk of FIG. 4 decreases and an intermediate body 210 is further disposed around the lower metal hub 206a.

In the small form factor optical/magnetic disk of FIG. 8, the upper metal hub 204 includes a central portion 204c in which a central hole 202 is formed, and first and second circumferential portions 204d and 204e formed around the central portion 204c. The thickness of the upper metal hub 204 is less than the thickness of the lower metal hub 206a. The diameter of the lower metal hub 206a of FIG. 8 is less than the diameter of the lower metal hub 206 of FIG. 4, and is equal to the first circumferential portion 204d.

The intermediate body 210 is installed around the lower metal hub 206a. The intermediate body 210 is made of polymer so that the intermediate body 210 can be combined with the lower metal hub 206a made of metal. The diameter of the intermediate body 210 is equal to the diameter of the second circumferential portion 204e. The diameter of the intermediate body 210 is equal to the diameter of the through-hole 112 of the disk plate 110. The intermediate body 210 and the lower metal hub 206a have the same thickness, and the overall thickness of the intermediate body 210 and the upper metal hub 204 is equal to the thickness of the disk plate 110. The diameter of the lower metal hub 206 is in the range of 40-70% of the diameter of the intermediate body 210.

The recess 114 is formed around the through-hole 112 of the disk plate 110. A difference between the diameters of the upper metal hub 204 and the intermediate body 210 is equal to the width w of the recess 114 formed around the through-hole 112. The thickness of the upper metal hub 204 is equal to the depth of the recess 114. Accordingly, the integrated metal hub 200 and the intermediate body 210 can be precisely inserted into the through-hole 112 and mounted on the recess 114.

Figure 10:
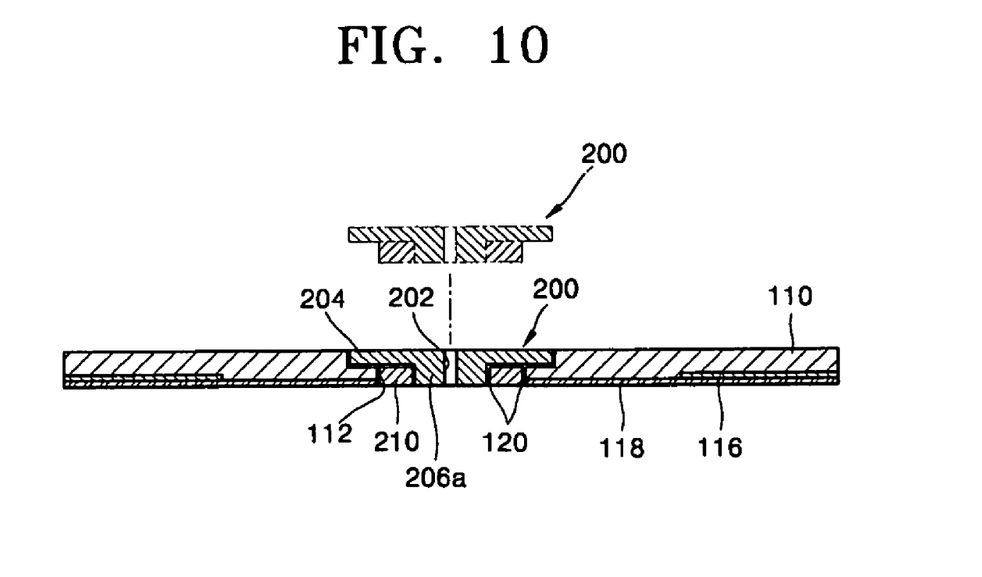
FIG. 10 is a cross-sectional view of the small form factor optical/magnetic disk of FIG. 8.
Figure 11:
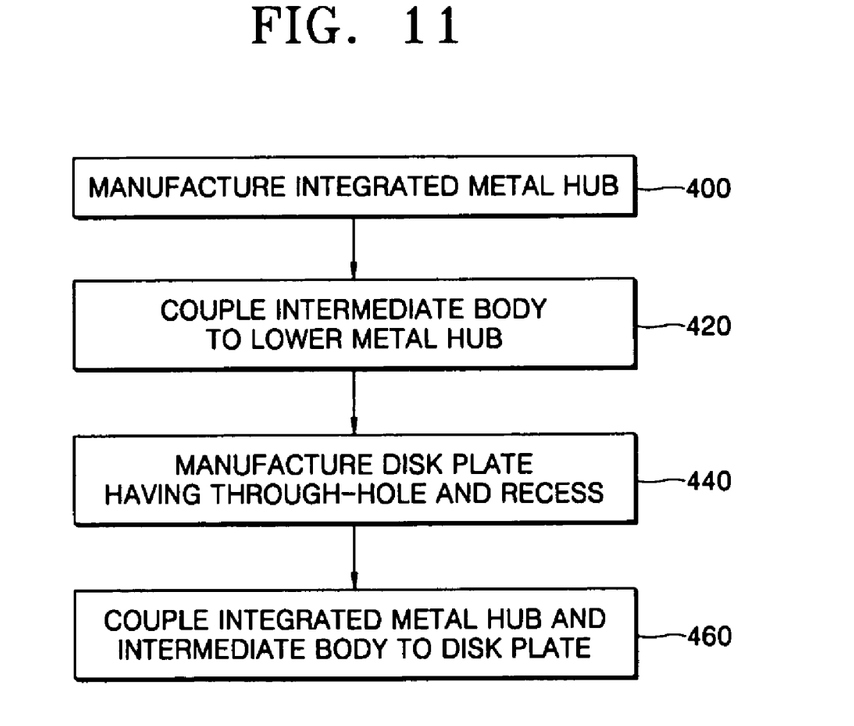
FIG. 11 is a flow chart illustrating a method of manufacturing the small form factor optical/magnetic disk of FIG. 8.

FIG. 10 is a cross-sectional view of the small form factor optical/magnetic disk of FIG. 8 when the integrated metal hub 200 is coupled to the disk plate 110. FIG. 11 is a flow chart illustrating a method of manufacturing the small form factor optical/magnetic disk of FIG. 8.

Referring to FIG. 10, in operation 400, the integrated metal hub 200 is manufactured. The integrated metal hub 200 is made of a metal, e.g., nickel or iron, attracted to a magnet. A surface of the integrated metal hub 200 is subjected to oxidation resistant coating.

In operation 420, the intermediate body 210 is coupled to the outer-surface of the lower metal hub 206a of the integrated metal hub 200 using an epoxy. In other words, the epoxy is introduced between the lower metal hub 206a and the intermediate body 210 and then heated to couple the lower metal hub 206a and the intermediate body 210. The structures of the integrated metal hub 200 and the intermediate body 210 have already been explained with reference to FIGS. 8 and 9, and will not be described again.

In operation 440, the disk plate 110 including the through-hole 112 and the recess 114 is manufactured. The disk plate 110 is made of polycarbonate. The recess 114 is formed during a mask molding process for manufacturing the disk plate 110, and the through-hole 112 is formed using a punching process after the disk plate 110 is manufactured.

In operation 460, the integrated metal hub 200 and intermediate body 210 are coupled to the disk plate 110 using an epoxy 120. The diameter of the through-hole 112 is equal to the diameter of the intermediate body 206, and the depth of the through-hole 112 is equal to the overall thickness of the intermediate body 210 and the upper metal hub 204. The recess 114 has a depth equal to the thickness of the upper metal hub 204, and a width corresponding to a difference between the diameters of the first circumferential portion 204d and the second circumferential portion 204e. Accordingly, the integrated metal hub 200 can be precisely inserted into the through-hole 112 and mounted on the recess 114 of the disk plate 110.

As described above, the small form factor optical/magnetic disk of the present invention can be simply manufactured by omitting a process of coupling a metal hub to an intermediate plate and attaching the metal hub to upper and lower surfaces of a disk plate.

Since the small form factor optical/magnetic disk of the present invention does not employ the intermediate plate used in the conventional disk, the central portion of the optical/magnetic disk is not thick. Also, the small form factor optical/magnetic disk of the present invention does not use a cartridge case. Hence, the small form factor optical/magnetic disk can be made compact and contribute to a thin information storage device.

Moreover, since the small form factor optical/magnetic disk can be simply manufactured, manufacturing costs can be reduced. Since unnecessary pollution or defection sources are not produced, the price and quality competitiveness of the small form factor optical/magnetic disk can be enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A small form factor optical/magnetic disk comprising:
an integrated metal hub comprising:
a circular upper metal hub coupled to a disk plate using an epoxy; and
a circular lower metal hub coupled to a disk plate using the epoxy, wherein the lower metal hub is integrally formed with and disposed under the upper metal hub, and has a smaller diameter than the upper metal hub, wherein a central hole is formed in and passes through central portions of the upper and lower metal hubs, wherein the integrated metal hub has an overall thickness;
an intermediate body coupled to an outer-surface of the lower metal hub using the epoxy; and
the disk plate comprising:
a through-hole formed in a central portion that passes entirely through the disk plate such that the through-hole has a depth substantially equal to a depth of the disk plate, and
a recess that is formed around the through-hole and allows the upper metal hub to be mounted therein, wherein the depth of the through-hole of the disk plate is substantially equal to the overall thickness of the integrated metal hub such that top and all bottom surfaces of the integrated metal hub and of the disk plate are substantially flush with each other when the integrated metal hub is nested within the through-hole of the disk plate wherein the overall thickness of the integrated metal hub is equal to that of the disk plate such that the upper and lower surfaces of the integrated metal hub are coplanar with corresponding upper and lower surfaces of the disk plate.

2. The small form factor optical/magnetic disk of claim 1, wherein the intermediate body and the upper metal hub are inserted into the through-hole.

3. The small form factor optical/magnetic disk of claim 1, wherein the through-hole has a diameter equal to the diameter of the lower metal hub, and has a thickness equal to the thickness of the integrated metal hub.

4. The small form factor optical/magnetic disk of claim 1, wherein the recess is formed around the through-hole, and has a depth equal to the thickness of the upper metal hub and a width corresponding to a difference between the diameters of the upper metal hub and the lower metal hub.

5. The small form factor optical/magnetic disk of claim 1, wherein the thickness of the integrated metal hub is equal to the thickness of the disk plate.

6. The small form factor optical/magnetic disk of claim 1, wherein the thickness of the upper metal hub is less than the thickness of the lower metal hub.

7. The small form factor optical/magnetic disk of claim 1, wherein the diameter of the lower metal hub is in the range of 50-90% of the diameter of the upper metal hub.

8. The small form factor optical/magnetic disk of claim 1, wherein the thickness of the upper metal hub is in the range of 20-50% of the overall thickness of the integrated metal hub.

9. A small form factor optical/magnetic disk comprising:
an integrated metal hub comprising:
a circular upper metal hub coupled to a disk plate using an epoxy, wherein the upper metal hub has a central portion and a circumferential portion formed around the central portion;
a circular lower metal hub coupled to the disk plate using the epoxy, wherein the lower metal hub is integrally formed with and disposed under the upper metal hub to correspond to the central portion of the upper metal hub
wherein a central hole is formed in and passes through central portions of the upper and lower metal hubs, and wherein the integrated metal hub has an overall thickness;
an intermediate body coupled to an outer-surface of the lower metal hub using the epoxy; and
the disk plate comprising:
a through-hole that passes entirely through the disk plate, that has a diameter equal to the diameter of the lower metal hub and a depth equal to the overall thickness of the integrated metal hub, and
a recess that is formed around the through-hole and has a depth equal to the thickness of the upper metal hub and a width corresponding to a difference between the diameters of the central portion and the circumferential portion,
wherein the integrated metal hub is nested within the through-hole and mounted onto the recess of the disk plate wherein the depth of the through-hole of the disk plate is substantially equal to the overall thickness of the integrated metal hub such that top and all bottom surfaces of the integrated metal hub and of the disk plate are substantially flush with each other when the integrated metal hub is nested within the through-hole of the disk plate wherein the overall thickness of the integrated metal hub is equal to that of the disk plate such that the upper and lower surfaces of the integrated metal hub are coplanar with corresponding upper and lower surfaces of the disk plate.

10. The small form factor optical/magnetic disk of claim 9, wherein the thickness of the upper metal hub is less than the thickness of the lower metal hub.

11. The small form factor optical/magnetic disk of claim 9, wherein the diameter of the lower metal hub is in the range of 50-90% of the diameter of the upper metal hub.

12. The small form factor optical/magnetic disk of claim 9, wherein the thickness of the upper metal hub is in the range of 20-50% of the overall thickness of the integrated metal hub.

13. A small form factor optical/magnetic disk comprising:
an integrated metal hub comprising:
a circular upper metal hub coupled to a disk plate using an epoxy; and
a circular lower metal hub coupled to the disk plate using the epoxy, wherein the lower metal hub is integrally formed with and disposed under the upper metal hub, and has a smaller diameter than the upper metal hub, wherein a central hole is formed in and passes through central portions of the upper and lower metal hubs, and wherein the integrated metal hub has an overall thickness;
an intermediate body coupled to an outer-surface of the lower metal hub using the epoxy such that the intermediate body is formed around the lower metal hub and has a smaller diameter than the upper metal hub and a thickness equal to the thickness of the lower metal hub; and
the disk plate comprising:
a through-hole that is formed in a central portion that passes entirely through the disk plate, wherein the through-hole has a depth substantially equal to a depth of the disk plate; and
a recess that is formed around the through-hole and allows the upper metal hub to be mounted therein, wherein the depth of the through-hole of the disk plate is substantially equal to the overall thickness of the integrated metal hub such that top and all bottom surfaces of the integrated metal hub and of the disk plate are substantially flush with each other when the integrated metal hub is nested within the through-hole of the disk plate
wherein the overall thickness of the integrated metal hub is equal to that of the disk plate such that the upper and lower surfaces of the integrated metal hub are coplanar with corresponding upper and lower surfaces of the disk plate.

14. The small form factor optical/magnetic disk of claim 13, wherein the through-hole has a diameter equal to the diameter of the intermediate body and a depth equal to the overall thickness of the intermediate body and the upper metal hub.

15. The small form factor optical/magnetic disk of claim 13, wherein the recess is formed around the through-hole and has a depth equal to the thickness of the upper metal hub and a width corresponding to a difference between the diameters of the upper metal hub and the intermediate body.

16. The small form factor optical/magnetic disk of claim 13, wherein the overall thickness of the upper metal hub and the intermediate body is equal to the thickness of the disk plate.

17. The small form factor optical/magnetic disk of claim 13, wherein the disk plate has a protection layer.

18. The small form factor optical/magnetic disk of claim 1, wherein the disk plate has a protection layer.

19. The small form factor optical/magnetic disk of claim 9, wherein the disk plate has a protection layer.

20. The small form factor optical/magnetic disk of claim 13, wherein the intermediate body is comprised of polymer.

* * * * *